(12) United States Patent
Wei et al.

(10) Patent No.: US 9,193,586 B2
(45) Date of Patent: Nov. 24, 2015

(54) CABLE

(75) Inventors: Yang Wei, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 541 days.

(21) Appl. No.: 13/042,466

(22) Filed: Mar. 8, 2011

(65) Prior Publication Data

US 2012/0125656 A1    May 24, 2012

(30) Foreign Application Priority Data

Nov. 18, 2010   (CN) .......................... 2010 1 0549606

(51) Int. Cl.
*H01B 11/06* (2006.01)
*B82Y 30/00* (2011.01)
*H01B 7/30* (2006.01)
*H01B 7/02* (2006.01)

(52) U.S. Cl.
CPC . *B82Y 30/00* (2013.01); *H01B 7/30* (2013.01); *H01B 7/0208* (2013.01)

(58) Field of Classification Search
USPC .................. 174/102 SC, 103, 106 R, 120 SC
See application file for complete search history.

(56) References Cited

U.S. PATENT DOCUMENTS

| | | | |
|---|---|---|---|
| 5,558,794 A * | 9/1996 | Jansens ........................ 219/549 |
| 7,314,997 B1 * | 1/2008 | Mui ............................... 174/28 |
| 7,449,631 B2 * | 11/2008 | Lee et al. ...................... 174/28 |
| 7,491,883 B2 * | 2/2009 | Lee et al. ...................... 174/28 |
| 7,544,886 B2 * | 6/2009 | Detian et al. .................... 174/36 |
| 2004/0020681 A1 * | 2/2004 | Hjortstam et al. ...... 174/102 SC |
| 2008/0251270 A1 * | 10/2008 | Lee et al. ................. 174/105 R |
| 2008/0254675 A1 | 10/2008 | Lee et al. |
| 2009/0255706 A1 | 10/2009 | Jiang et al. |

FOREIGN PATENT DOCUMENTS

| | | |
|---|---|---|
| CN | 101286383 | 10/2008 |
| CN | 101556839 | 10/2009 |
| TW | 200945372 | 11/2009 |

* cited by examiner

*Primary Examiner* — Chau N Nguyen
(74) *Attorney, Agent, or Firm* — Novak Druce Connolly Bove + Quigg LLP

(57) ABSTRACT

A cable includes a conductive core, an insulating layer, a shielding layer, and a sheath. The sheath coats the shielding layer. The shielding layer coats the insulating layer. The insulating layer coats the conductive wire. The conductive core includes a conductive wire and a carbon nanotube film comprising a plurality of carbon nanotubes. The carbon nanotubes coat the conductive core.

10 Claims, 5 Drawing Sheets

CABLE

BACKGROUND

1. Technical Field

The present disclosure relates to a cable including a conductive core with a carbon nanotube layer.

2. Description of Related Art

An electrical cable including a conductive core, an insulating layer, and a shielding layer, is usually surrounded by a sheath. The conductive core can be a solid or braided wire, and the shielding layer can be a wound foil, a woven tape, or a braid. The internal insulating layer (i.e., a dielectric) acts as a physical support, and electrically isolates and maintains a constant space between the conductive core and the shielding layer.

The cable may be rigid or flexible. Typically, the rigid type has a solid conductive core, while the flexible type has a braided conductive core. The conductive cores for both types are usually made of metal wires, such as thin copper wires. The insulating layer, also called the dielectric, has a significant effect on the cable's properties such as characteristic impedance and attenuation. The dielectric may be solid or perforated with air spaces. The shielding layer ensures that the signal to be transmitted stays inside the cable and that all other signals stay out (in other words it acts as a two-way signal shield). The shielding layer also serves as a conductor or ground wire.

However, for a conductive core made of a metal wire, a skin effect will occur in the conductive core. The effective resistance of the cable becomes larger and causes signal decay during transmission. Furthermore, the conductive core and the shielding layer have less strength, so the weight and diameter must be greater to compensate.

Thus, there remains a need for providing a new cable to overcome the aforementioned shortcomings.

BRIEF DESCRIPTION OF THE DRAWINGS

Many aspects of the disclosure can be better understood with reference to the drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
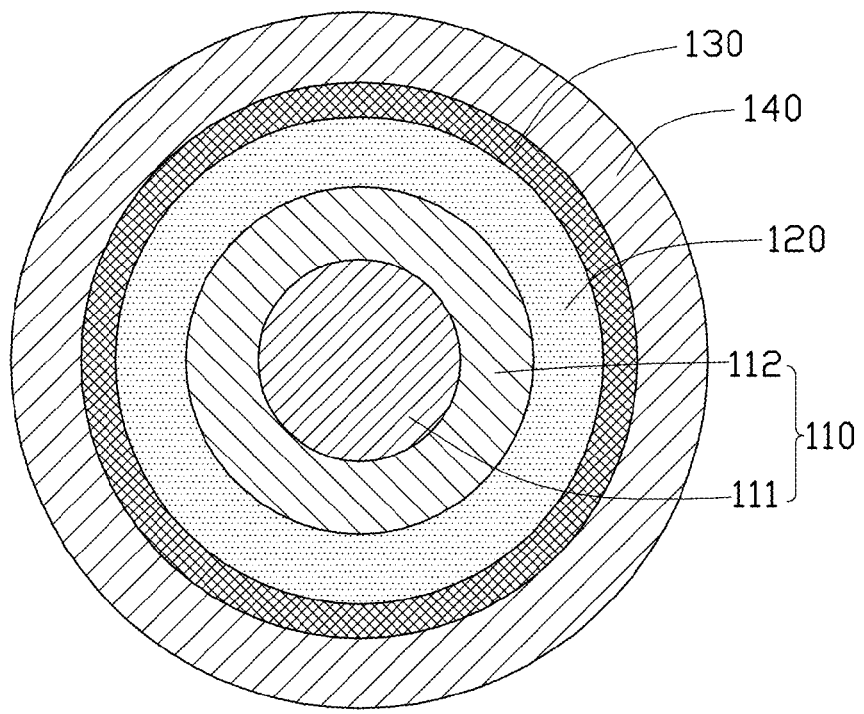
FIG. 1 is a cross-sectional view of one embodiment of a cable.

According to one embodiment, a cable 10 as illustrated in FIG. 1 comprises a conductive core 110, an insulating layer 120, a shielding layer 130, and a sheath 140. The insulating layer 120 coats the conductive core 110. The shielding layer 130 coats the insulating layer 120. The sheath 140 coats the shielding layer 130. The conductive core 110, the insulating layer 120, the shielding layer 130, and the sheath 140 are coaxially arranged.

The conductive core 110 comprises a conductive wire 111 and a carbon nanotube film 112. The carbon nanotube film 112 comprises a plurality of carbon nanotubes surrounding the conductive wire 111. The conductive wire 111 can be gold, silver, copper, tin, or any combination thereof. The insulating layer 120 can be polytetrafluoroethylene (PTFE), polyethylene (PE), polypropylene (PP), polystyrene (PS), polymer nano-composites, or any combinations thereof. The shielding layer 130 can be metals, carbon nanotubes, composite having carbon nanotubes, composite having metals, or any combinations thereof.

Figure 2:
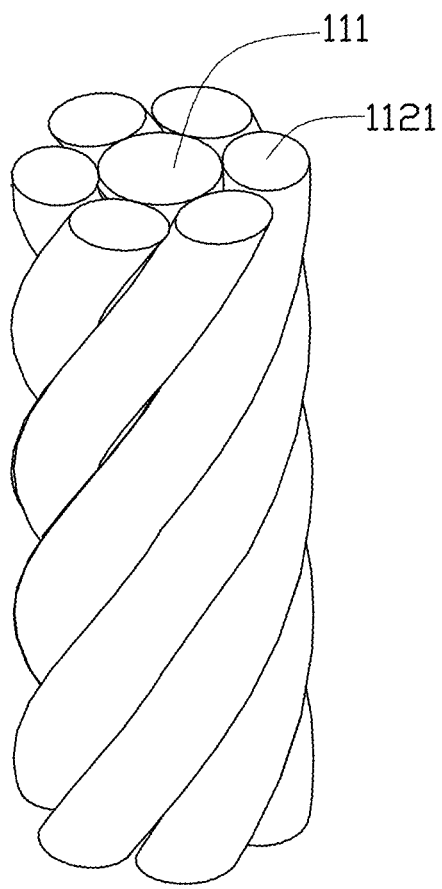
FIG. 2 is a schematic view of one embodiment of a conductive core of the cable shown in FIG. 1.

FIG. 2 is a schematic view of one embodiment of a conductive core 110 of the cable 10 shown in FIG. 1. As shown in FIG. 2, the carbon nanotubes of the carbon nanotube film 112 are organized as a plurality of carbon nanotube wires 1121. More specifically, the carbon nanotube wires 1121 helically surround the conductive wire 111.

An angle between an extended direction of each of the plurality of carbon nanotube wires 1121 and an axis of the conductive wire 111 is in a range from about 0 degrees to about 90 degrees. A diameter of the conductive wire 111 is in a range from about 4.5 nanometers (nm) to about 20 micrometer (um). A thickness of the carbon nanotube film 112 is in a range from about 1.5 um to about 15 um. A ratio of the thickness of the carbon nanotube film 112 to a diameter of the conductive core 110 is in a range from about 1:60 to about 2:1. In one embodiment, the thickness of the carbon nanotube film 112 is about 12 um, and the diameter of the conductive wire 111 is about 18 um. Thus, a percentage of elongation of the conductive core 110 is about 10%.

Figure 3:
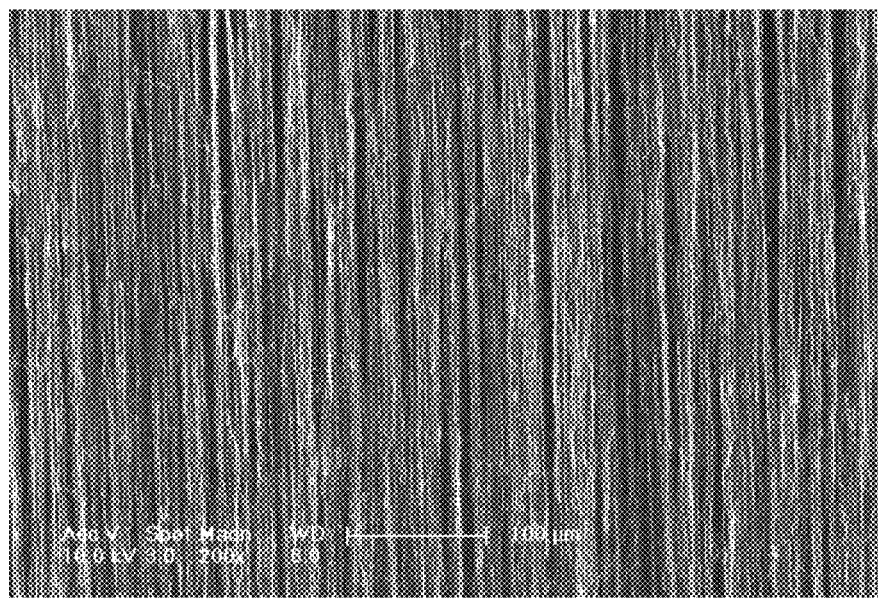
FIG. 3 shows a Scanning Electron Microscope (SEM) image of a carbon nanotube film comprising a plurality of carbon nanotubes.

Referring to FIG. 3, each of the carbon nanotube wires 1121 including the carbon nanotubes has a free-standing structure. The term "free-standing structure" means that each of the carbon nanotube wires 1121 can sustain the weight of itself when it is hoisted by a portion thereof without any significant damage to its structural integrity. So, if each of the carbon nanotube wires 1121 is placed between two separate supports, a portion of each of the carbon nanotube wires 1121 not in contact with the two supports would be suspended between the two supports and maintain film structural integrity.

More specifically, a large number of the carbon nanotubes in each of the carbon nanotube wires 1121 can be oriented along a preferred direction, meaning that a large number of the carbon nanotubes in each of the carbon nanotube wires 1121 are arranged substantially along the same direction and substantially parallel to the surface of each of the carbon nanotube wires 1121. An end of one carbon nanotube is joined to another end of an adjacent carbon nanotube arranged substantially along the same direction by van der Waals force. A small number of the carbon nanotubes are randomly arranged in each of the carbon nanotube wires 1121, and have a small, if not negligible effect on the larger number of the carbon nanotubes in each of the carbon nanotube wires 1121 arranged substantially along a same direction.

The carbon nanotubes in each of the carbon nanotube wires 1121 can be single-walled carbon nanotubes, double-walled carbon nanotubes, multi-walled carbon nanotubes, or any combination thereof. The diameter of the single-walled carbon nanotubes is in a range from about 0.5 nm to about 10 nm, the diameter of the double-walled carbon nanotubes is in a range from about 1 nm to about 15 nm, and the diameter of the multi-walled carbon nanotubes is in a range from about 1.5 nm to about 50 nm. The length of the carbon nanotubes is greater than 50 μm.

A method for making the carbon nanotubes includes: (a) selecting a carbon nanotube segment having a predetermined width from a carbon nanotube array; and (b) pulling the carbon nanotube segment at a substantially even/uniform speed to achieve a uniform drawn carbon nanotube film comprising carbon nanotubes. The pulling/drawing can be done by using a tool (adhesive tape, pliers, tweezers, or another tool allowing multiple carbon nanotubes to be gripped and pulled simultaneously).

Figure 4:
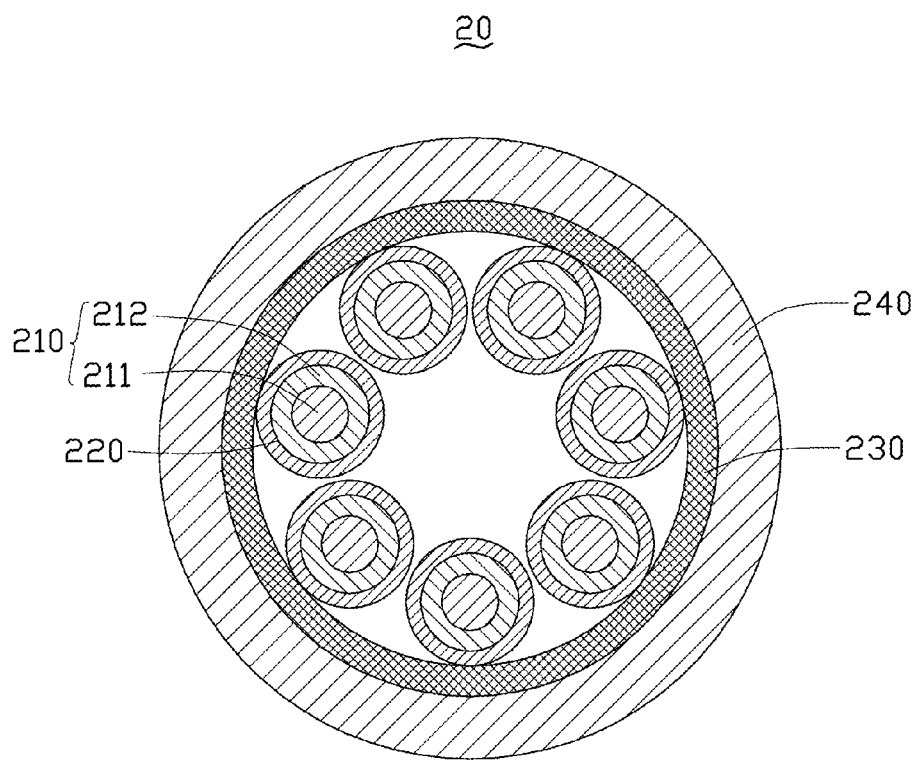
FIGS. 4 and 5 are cross-section views of other embodiments of a cable.

According to another embodiment, a cable 20 as illustrated in FIG. 4 comprises a plurality of conductive cores 210, a plurality of insulating layers 220, a shielding layer 230, and a sheath 240. The insulating layers 220 respectively coat the conductive cores 210. The sheath 240 coats the shielding layer 230. The shielding layer 230 and the sheath 240 define a cavity.

Each of the conductive cores 210 comprises a conductive wire 211 and a carbon nanotube film 212. The carbon nanotube film 212 comprises a plurality of carbon nanotubes surrounding the conductive wire 211.

As shown in FIG. 4, there are seven conductive cores 210 and corresponding insulating layers 220 deposed in the cavity of the cable 20. Each of the conductive cores 210 of the cable 20 is the same as the conductive core 110 of the cable 10 shown in FIG. 2. In this embodiment, the carbon nanotubes of the carbon nanotube film 212 are organized as a plurality of carbon nanotube wires. The carbon nanotube wires helically surround the conductive wire 211. An angle between an extended direction of each of the plurality of carbon nanotube wires and an axis of the conductive wire 211 is in a range from about 0 degrees to about 90 degrees.

Figure 5:
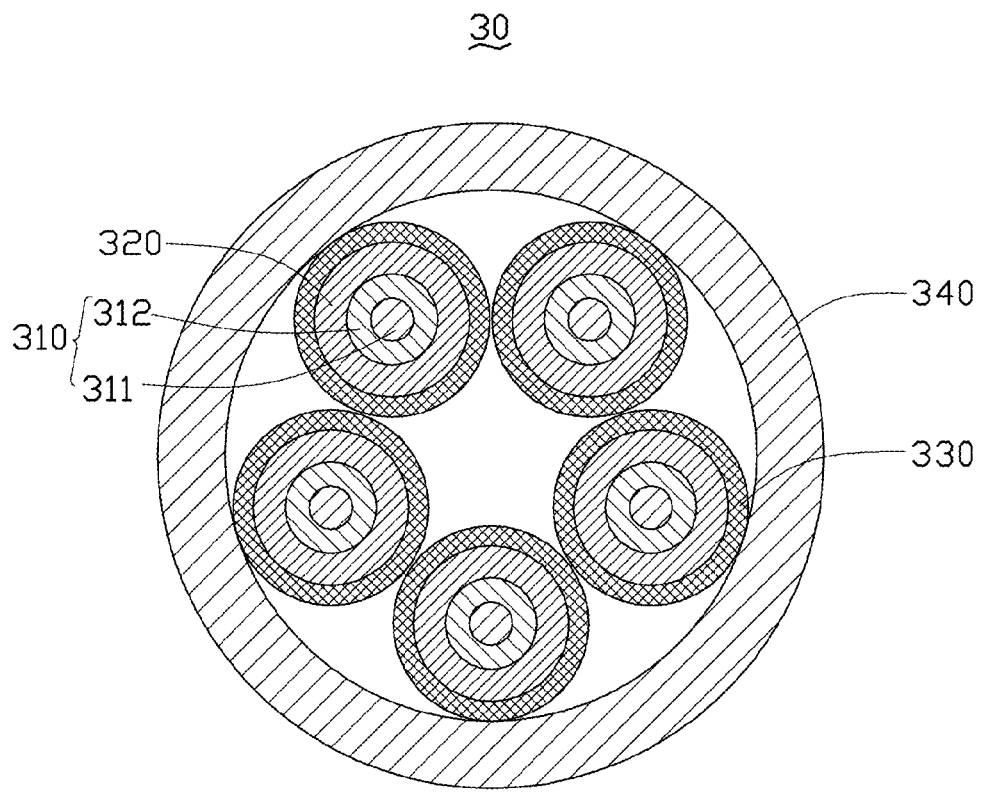

According to still another embodiment, a cable 30 as illustrated in FIG. 5 comprises a plurality of conductive cores 310, a plurality of insulating layers 320, a plurality of shielding layers 330, and a sheath 240. The insulating layers 320 respectively coat the conductive cores 310. The shielding layers 330 respectively coat the insulating layers 320. The sheath 240 defines a cavity.

Each of the conductive cores 310 comprises a conductive wire 311 and a carbon nanotube film 312. The carbon nanotube film 312 comprises a plurality of carbon nanotubes surrounding the conductive wire 311.

As shown in FIG. 5, there are five conductive cores 310 and corresponding insulating layers 320 and shielding layers 330 disposed in the cavity of the cable 30. Each of the conductive cores 310 of the cable 30 is the same as the conductive core 110 of the cable 10 shown in FIG. 2. More specifically, the carbon nanotubes of the carbon nanotube film 312 are organized as a plurality of carbon nanotube wires. The carbon nanotube wires helically surround the conductive wire 311. An angle between an extended direction of each of the plurality of carbon nanotube wires and an axis of the conductive wire 311 is in a range from about 0 degrees to about 90 degrees.

Accordingly, the present disclosure provides a cable with at least one conductive core. Because the conductive core comprises one carbon nanotube film or a plurality of carbon nanotube wires, the conductive core has high mechanical performance, lightweight, and small diameter. In addition, the conductive core with the carbon nanotube film or carbon nanotube wires has good conductivity. Thus, extremely small cables can be easily manufactured with carbon nanotube film or carbon nanotube wires.

It is to be understood that the above-described embodiments are intended to illustrate rather than limit the disclosure. Any elements described in accordance with any embodiments is understood that they can be used in addition or substituted in other embodiments. Embodiments can also be used together. Variations may be made to the embodiments without departing from the spirit of the disclosure. The above-described embodiments illustrate the scope of the disclosure but do not restrict the scope of the disclosure.

What is claimed is:

1. A cable, comprising:
    a plurality of conductive cores, wherein each of the plurality of conductive cores consists of:
        a conductive wire; and
        a carbon nanotube film consisting of a plurality of carbon nanotubes coated on an outer surface of the conductive wire, wherein the plurality of carbon nanotubes are adjacent to the outer surface of the conductive wire;
    an insulating layer coating each of the plurality of conductive cores;
    a shielding layer; and
    a sheath coating the shielding layer, wherein the shielding layer and the sheath define a cavity, and the plurality of conductive cores coated with the insulating layer are disposed in the cavity.

2. The cable as claimed in claim 1, wherein the plurality of carbon nanotubes are organized as a plurality of carbon nanotube wires.

3. The cable as claimed in claim 2, wherein the plurality of carbon nanotube wires helically surround the conductive wire.

4. The cable as claimed in claim 1, wherein an angle between an extended direction of each of the plurality of carbon nanotubes and an axis of the conductive wire is greater than 0 degrees and smaller than or equal to 90 degrees.

5. A cable, comprising:
    a plurality of conductive cores, wherein each of the plurality of conductive cores consists of:
        a conductive wire; and
        a carbon nanotube film comprising a plurality of carbon nanotubes coating an outer surface of the conductive wire, wherein the plurality of carbon nanotubes are joined end-to-end by van der Waals force;
    an insulating layer coating the carbon nanotube film of each of the plurality of conductive cores;
    a shielding layer coating the insulating layer on each of the plurality of conductive cores; and
    a sheath defining a cavity, wherein the plurality of conductive cores respectively coated with the insulating layer and the shielding layer are disposed in the cavity.

6. The cable as claimed in claim 5, wherein the plurality of carbon nanotubes are organized as a plurality of carbon nanotube wires.

7. The cable as claimed in claim 6, wherein the plurality of carbon nanotube wires helically surround the conductive core.

8. The cable as claimed in claim 6, wherein each of the plurality of carbon nanotube wires is free-standing.

9. The cable as claimed in claim 6, wherein the plurality of carbon nanotubes in each of the carbon nanotube wires are arranged substantially along the same direction and substantially parallel to the surface of each of the carbon nanotube wires.

10. The cable as claimed in claim 5, wherein an angle between an extended direction of each of the plurality of carbon nanotubes and an axis of the conductive wire is greater than 0 degrees and smaller than or equal to 90 degrees.

* * * * *